(12) United States Patent
Wright et al.

(10) Patent No.: US 8,595,532 B1
(45) Date of Patent: Nov. 26, 2013

(54) AUTOMATIC POWER SAVING SYSTEM AND METHOD FOR POWER INTERUPTIONS

(75) Inventors: Paul P. Wright, Dooradoyle (IE); Thomas Meany, Bruff (IE); John P. Healy, Coolcotts (IE); Shaun Bradley, Murroe (IE); Kieran Berney, Dooradoyle (IE); Paul Maher, Nenagh (IE)

(73) Assignee: Analog Devices, Inc., Norwood, MA (US)

( * ) Notice: Subject to any disclaimer, the term of this patent is extended or adjusted under 35 U.S.C. 154(b) by 1201 days.

(21) Appl. No.: 12/217,319

(22) Filed: Jul. 3, 2008

Related U.S. Application Data (60) Provisional application No. 60/959,286, filed on Jul. 12, 2007.

(51) Int. Cl.
*G06F 1/32* (2006.01)
(52) U.S. Cl.
USPC .......................................... 713/324; 713/322
(58) Field of Classification Search
USPC ................................. 713/324, 322
See application file for complete search history.

(56) References Cited

U.S. PATENT DOCUMENTS

| 5,381,554 A * | 1/1995 | Langer et al. ................... 714/14 |
| 5,394,017 A * | 2/1995 | Catano et al. ................... 307/66 |
| 5,845,142 A * | 12/1998 | Hayasaka ...................... 713/340 |
| 6,516,418 B1 * | 2/2003 | Lee ............................... 713/320 |
| 6,665,806 B1 * | 12/2003 | Shimizu ........................ 713/324 |
| 6,785,829 B1 * | 8/2004 | George et al. ................. 713/320 |
| 7,007,179 B2 * | 2/2006 | Mares et al. .................. 713/310 |

FOREIGN PATENT DOCUMENTS

| JP | 10-069592 | * 3/1998 |
| JP | 10-069592 | * 10/1998 |

* cited by examiner

*Primary Examiner* — Chun Cao
(74) *Attorney, Agent, or Firm* — Kenyon & Kenyon LLP (57) ABSTRACT

Automatic power saving for decreasing power demand during a power interruption while maintaining the appearance of full operation of a signal processor including predefined power consuming circuits, a communications interface, and a state machine includes sensing when a power supply interruption has occurred, providing a clock signal, halting the clock signal to the predefined power consuming circuits during a power interruption; and continuing to provide a clock signal to a communications interface regardless of a sensed interruption for maintaining the appearance of normal operations during the sensed interruption.

28 Claims, 9 Drawing Sheets

AUTOMATIC POWER SAVING SYSTEM AND METHOD FOR POWER INTERUPTIONS

RELATED APPLICATIONS

This application claims benefit of and priority to U.S. Provisional Application Ser. No. 60/959,286 filed Jul. 12, 2007 incorporated herein by this reference.

FIELD OF THE INVENTION

This invention relates to an automatic power saving system and method for decreasing power demand during a power interruption while maintaining the appearance of full operation of a signal processor.

BACKGROUND OF THE INVENTION

In some applications e.g. automotive applications, electrical components such as signal processor circuit chips for monitoring or measuring fluid levels are required to continue operation in the presence of extreme electromagnetic interference (EMI) signals. In some cases the interruption in the power supply can extend for a period of time sufficient to completely discharge the power supply decoupling capacitor. When this occurs the memory in the state machine e.g. microprocessor of the signal processor, is lost and the entire signal processor has to be reset resulting in loss of data and interruption of the communication between the signal processor and the primary computer system of the vehicle. The operation of such a signal processor in a typical 12 volt automobile application can experience one of three states. State A, the normal operation range which extends, for example, from 12 volts to 4.2 volts. State B, a range wherein circuits may still operate and memory is not lost, e.g. from 4.2 volts to 2.4 volts. State C in which there is no operation and memory is lost from 2.4 volts to 0 volts. In certain applications there is a constraint imposed that the signal processor must suffer a power supply interruption of a given period, e.g. 50 μsecs without discharging the decoupling capacitor to below state A so as to prevent loss of memory and yet appear to be fully operational to the primary vehicle computer. One way to solve the problem is simply to enlarge the decoupling capacitor to a capacity where it can hold sufficient charge through the given period. However, enlargement of that capacitor is sometimes not an option.

SUMMARY OF THE INVENTION

It is therefore an object of this invention to provide an improved automatic power saving system and method for decreasing power demand during a power interruption.

It is a further object of this invention to provide such an automatic power saving system and method which decreases power demand during a power interruption while it maintains the appearance of conventional operation of a signal processor It is a further object of this invention to provide such an automatic power saving system and method which can be enabled at any time even during high activity operations which can be stopped and then resumed when the interruption is over. It is a further object of this invention to provide such an automatic power saving system and method which conserves power during a power interruption so there is no loss of memory.

It is a further object of this invention to provide such an automatic power saving system and method which requires no complex software operations/analysis to determine when to enter a power saving mode.

It is a further object of this invention to provide such an automatic power saving system and method which continues operation of the communications interface during a power saving operation to maintain the appearance of normal operation of the signal processor.

It is a further object of this invention to provide such an automatic power saving system and method which not only serves to extend power supply life but maintains some level of operation even when the power supply is interrupted or removed.

It is a further object of this invention to provide such an automatic power saving system and method which upon a power interruption conserves power over a period of time to ensure a preselected charge to survive on the decoupling capacitor.

It is a further object of this invention to provide such an automatic power saving system and method which can disable power to the state machine, e.g. microprocessor as well as other, non-essential circuits.

The invention results from the realization that an automatic power saving system and method for decreasing power demand during a power interruption while maintaining the appearance of full operation of a signal processor can be achieved by sensing an interruption when the power supply voltage varies from a predetermined level, then disabling non-essential circuitry to extend the discharge time of the decoupling capacitor over the specified interruption period so that voltage does not drop below the level at which the signal processor suffers memory loss while keeping the communication interface operational and maintaining the appearance of full operation of the signal processor; and the additional realization that the signal processor state machine itself may be disabled to save power without interfering with the performance of the automatic power saving system which operates without software supervision by the state machine.

The subject invention, however, in other embodiments, need not achieve all these objectives and the claims hereof should not be limited to structures or methods capable of achieving these objectives.

This invention features an automatic power saving system for decreasing power demand during a power interruption while maintaining the appearance of full operation of a signal processor including predetermined power consuming circuits, a communications interface, and a state machine.

There is a supply monitor for sensing when a power supply interruption has occurred and a clock for providing a clock signal.

A clock gate circuit is interconnected between the clock and the predefined power consuming circuits; and a response control circuit is responsive to the supply signal for operating the clock gate circuit to halt the clock signal to the predefined power consuming circuits, during a power interruption. The clock provides a clock signal to the communications interface regardless of a sensed interruption for maintaining the appearance of normal operations during the sensed interruption.

In a preferred embodiment the state machine may include a microprocessor controller. The clock gate circuit may provide a clock signal to the microprocessor controller which is halted upon a power interruption. The microprocessor controller may include a microprocessor. The microprocessor controller may include a ROM, a SRAM or a one time programmable memory (OTPM). The predetermined power consuming circuit may include a transducer signal channel responsive to the digital state machine to generate acoustic transducer transmission pulses and to deliver return pulses to the state machine. The signal processor may include other power consuming circuits. The other power consuming circuit may include a temperature sensor. The other power consuming circuits may include a low frequency oscillator and a watchdog circuit. The transducer signal channel may include a digital section, an analog section and a logic gate responsive to a signal from the digital section and the response control for enabling the analog section during the receipt of a return pulse in the absence of a sensed interruption. The supply monitor may include a comparator circuit with one input responsive to power supply voltage and the other input to a reference voltage level. The signal processor may further include a voltage regulator responsive to the power supply voltage to provide a regulated predefined voltage output. The comparator circuit may receive the regulated predefined voltage as the reference level. The supply monitor may include a first voltage divider interconnected between the one input of the comparator circuit and the power supply voltage and a second voltage divider interconnected between the other input of the comparator circuit and the regulated predefined voltage output for scaling down the power supply voltage and regulated predefined voltage to the range of the comparator circuit. The microprocessor controller may include a non-volatile multi-time-programmable memory.

This invention also features an automatic power saving system for decreasing power demand during a power interruption while maintaining the appearance of full operation of a signal processor including predetermined power consuming circuits, a communications interface, and a state machine including a supply monitor for sensing when a power supply interruption has occurred; and a clock for providing a clock signal. A clock gate circuit is interconnected between the clock and the predefined power consuming circuits between the clock and the state machine. A response control circuit responsive to the supply signal operates the clock gate circuit to halt the clock signal to the predefined power consuming circuits and the state machine, during a power interruption. The clock provides a clock signal to the communications interface regardless of a sensed interruption for maintaining the appearance of normal operations during the sensed interruption.

This invention also features an automatic power saving method for decreasing power demand during a power interruption while maintaining the appearance of full operation of a signal processor including predefined power consuming circuits, a communications interface, and a state machine including sensing when a power supply interruption has occurred, providing a clock signal, halting the clock signal to the predefined power consuming circuits during a power interruption; and continuing to provide a clock signal to a communications interface regardless of a sensed interruption for maintaining the appearance of normal operations during the sensed interruption. In a preferred embodiment the state machine may be halted during the sensed interruption.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
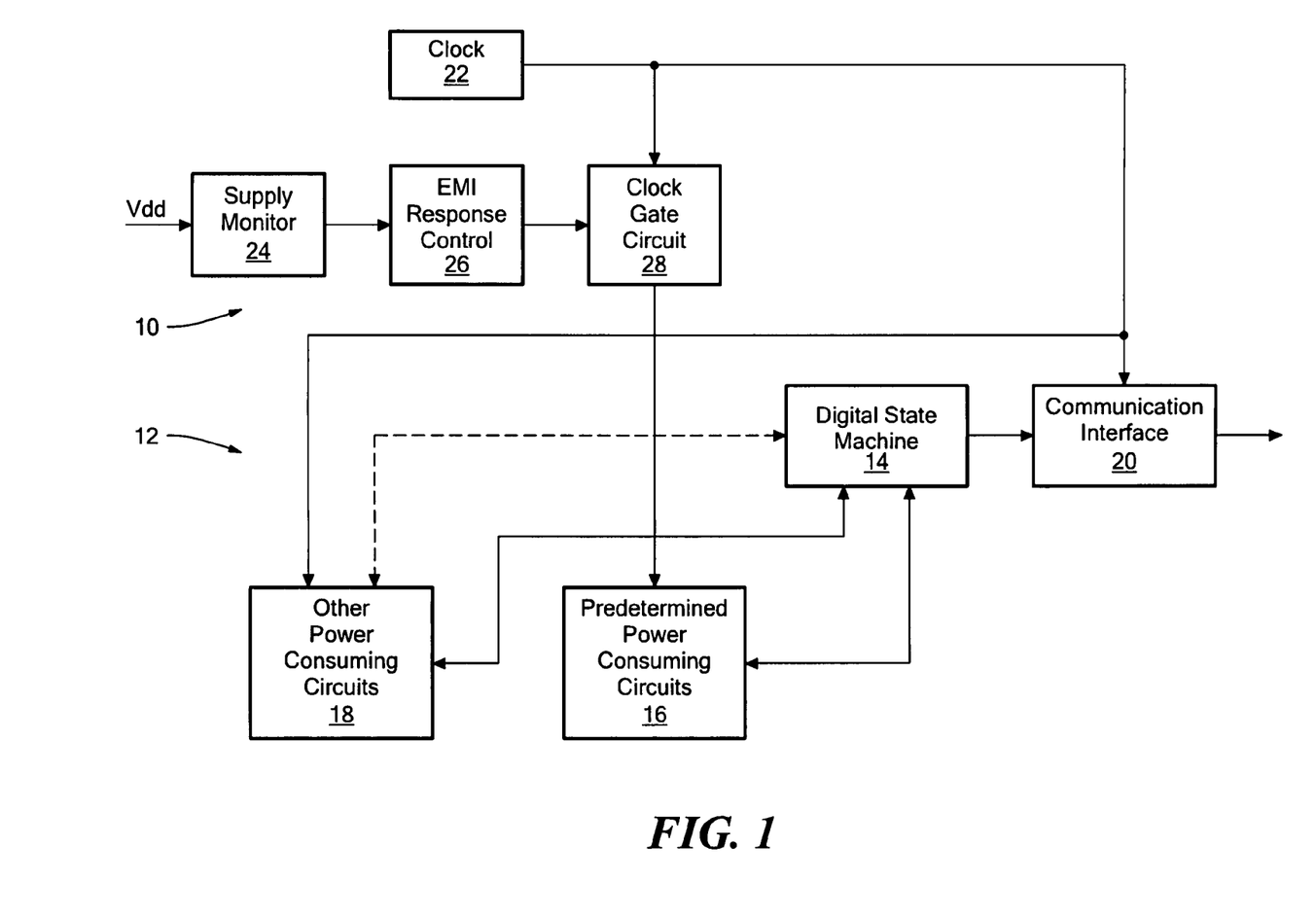
FIG. 1 is a schematic block diagram of one embodiment of an automatic power saving system according to this invention for decreasing power demand during a power interruption while maintaining the appearance of full operation of a signal processor.

There is shown in FIG. 1 an automatic power saving system 10 according to this invention and a signal processor 12. Signal processor 12 includes a digital state machine 14, some predetermined power consuming circuits 16 and other power consuming circuits 18 as well as a communications interface 20. Predetermined power consuming circuit 16 consumes substantial power while other power consuming circuits 18 consumes lower amounts of power. Both gather and/or process information in conjunction with digital state machine 14. The final output data is delivered to further processors or displays by communication interface 20. Signal processor 12 typically also includes a clock 22 which normally operates digital state machine 14, predetermined power consuming circuits 16 and other power consuming circuits 18.

In accordance with this invention the automatic power saving system 10 includes supply monitor 24, an electromagnetic interference (EMI) response control 26 and clock gate circuit 28. When the power supply voltage Vdd drops to some preselected level supply monitor 24 senses that level and provides a signal to EMI response control 26. It in turn operates clock gate circuit 28 to halt the clock signals from clock 22 to at least predetermined power consuming circuits 16. It may also halt the clock signals to other power consuming circuits 18 and even digital state machine 14. Digital state machine 14 may be halted in this manner because supply monitor 24 and EMI response control 26 operate their decision making process independent of digital state machine 14. Digital state machine 14 and other power consuming circuits 18 may receive their clock signals directly from clock 22 and not under control of clock gate circuit 28. When, then, supply monitor 24 senses a sufficient drop in supply voltage Vdd to trigger EMI response control 26 operation, clock gate circuit 28 halts clock signals to predetermined power consuming circuits 16 in order to save power so that at least for some specified period the system conserves power. However, even though predetermined power consuming circuit 16 and even other power consuming circuits 18 and digital state machine 14 may be denied operation due to disablement of the clock signal, communication interface 20 is not. Therefore, communication interface 20 operates continuously and gives the appearance of full operation even though the information gathering and processing operations of circuits 16 and 18 and even digital state machine 14 may be inoperative.

Figure 2:
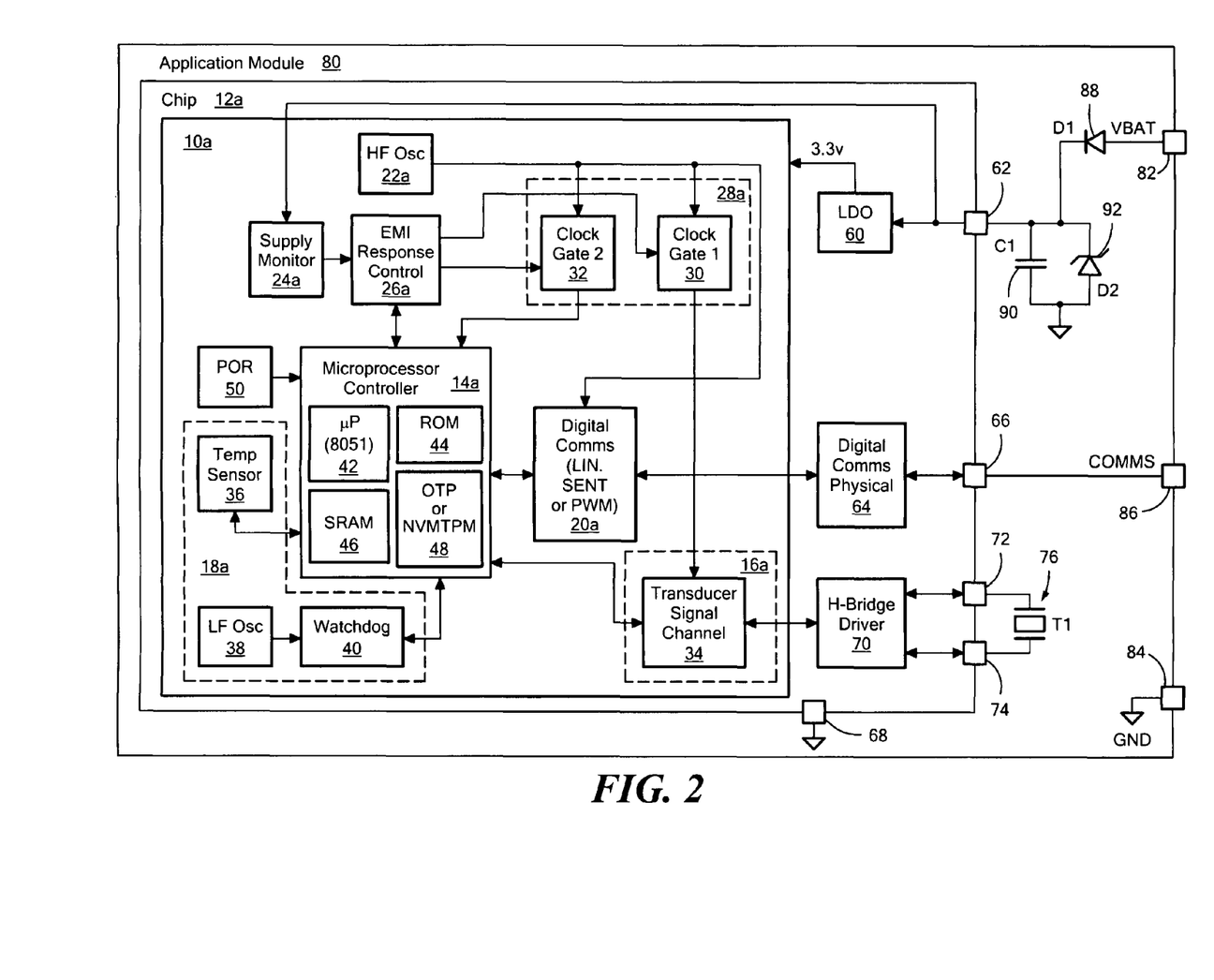
FIG. 2; is a more detailed schematic block diagram of another embodiment of the automatic power saving system for decreasing power demand during a power interruption while maintaining the appearance of full operation of a signal processor.

A more specific embodiment of the invention in a vehicle application is shown in FIG. 2 where like parts have been given like numbers accompanied by a lower case a. There it can be seen that clock gate circuit 28a actually includes two clock gates clock gate one, 30 and clock gate two, 32. Predetermined power consuming circuits 16a are represented in this case by one circuit: transducer signal channel 34, although two or many more circuits could be included. Transducer signal channel 34 contains a number of digital and analog circuits to produce an ultrasonic pulse and listen to the returning echo. The other power consuming circuits 18a may include for example a temperature sensor 36 and a low frequency oscillator 38 which drives a watch dog circuit 40. Digital state machine 14 may include a microprocessor controller 14a which may have a microprocessor 42, read only memory 44, static random access memory 46 and one time programmable memory 48. A power-on reset 50 may be provided for when a complete restart is required. Microprocessor controller 14a may include a non-volatile multi-time programmable memory (NVMTPM) such as, but not limited to EEPROM, flash memory, FeRAM.

Signal processor 12a may be formed of conventional devices. For example temperature sensor 36 may contain an analog to digital converter which provides a digital code representing temperature. Low frequency oscillator 38 may provide an approximately 130 KHz signal for timing the watchdog timer. The watchdog timer 40 can reset the part if it does not periodically receive the correct sequence from the microprocessor. Digital communications interface 20a communicates with the rest of the vehicle through a serial digital interface. There are three formats available: pulse width modulation (PWM), local interconnect network (LIN), and signal edge nibble transmission (SENT). Transducer signal channel 16a typically contains a number of digital and analog circuits to produce an ultrasonic pulse and listen to the returning echo which it relays to microprocessor controller 14a. High frequency oscillator 22a typically supplies a 20 MHz signal for clocking the digital system, in most cases this may be divided down to 2.5 MHz before being used. Supply monitor 24a provides a signal when the power supply falls before 8 volts for example. This signal is then acted on by EMI response controller 26a which then takes measures to conserve power. It does so by operating clock gates 30 and 32 included in clock gate circuit 28a. Clock gate one, 30, halts the clock signal to transducer signal channel 34; clock gate two, 32, may be provided to actually halt clock signals to microprocessor controller 14a. Both the automatic power saving system 10a and signal processor 12a are driven by a 3.3 volt supply from low drop out regulator (LDO) 60 which regulates the automobile battery voltage from 12 volts to 3.3 volts. It is connected to the power supply terminal 62. It should be understood that in the example of this embodiment the application of the invention is for an automobile and so the power supply is the automobile battery, but this is an example only and in no way limits the invention: the power supply is not limited to a battery or any of the specifics shown here. Also included is a digital communications physical circuit 64 which translates the 0 to 3.3 volt logical level output of digital comms 20a to the 0 to 12 volt level in the remainder of the circuit. Digital communications physical 64 is connected to communications terminal 66. There is also a ground terminal 68. Transducer signal channel 34 provides transmission pulses to and receives return pulses from H bridge driver 70, which through transducer terminals 72 and 74 connect to a transducer such as an acoustic transducer 76. H bridge driver 70 contains high voltage switches to apply a high amplitude ultrasonic pulse onto the ultrasonic transducer 76. Transducer 76 when receiving a transmission pulse produces an acoustic pulse which reflects off a surface or object of interest and returns through transducer terminal 72, 74 back to H bridge circuit 70 where the return pulse causes transducer signal channel 34 to respond to microprocessor controller 14a.

All of these elements plus signal processor 12a and automatic power saving system 10a are included in a vehicle application module which has a power supply pin 82, ground pin 84 and a communications pin 86. The battery voltage VBAT is delivered through reverse bias diode 88 to the power supply terminal Vdd 62. Also connected to terminal 62 is decoupling capacitor 90 and Zener diode 92. Reverse bias diode 88 prevents the charge on coupling capacitor 90 being drawn down when VBAT decreases. The reverse bias diode 88 may also be implemented using a diode connected MOSFET. Decoupling capacitor 90, typically 100 nf, smoothes out disturbances on the external supply. Due to space restrictions within the module in some applications the size of this capacitor cannot be increased. Zener diode 92 prevents the voltage on decoupling capacitor 90 from exceeding the Zener voltage, for example 24 volts.

Figure 2A:
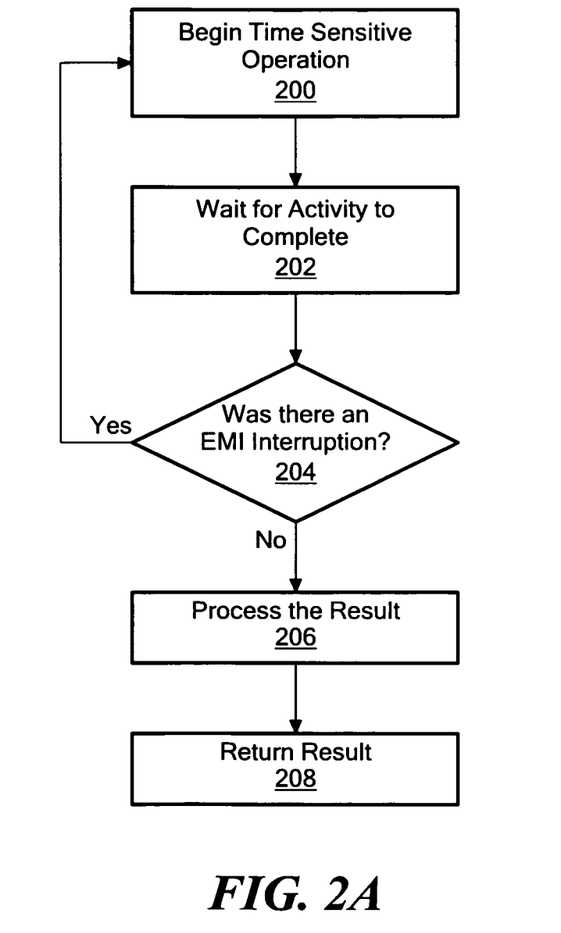
FIG. 2A is flow chart depicting the monitoring of the power supply interruption by the microcontroller of FIG. 2 to determine when to accept/reject incoming signal/acoustic data.

There is an interconnection shown between EMI response controller 26a and microprocessor controller 14a in FIG. 2. This is so that the microprocessor controller 14a can monitor the occurrence of EMI interruptions. Thus microprocessor controller 14a operates in the following fashion as shown in FIG. 2A. It initiates by beginning a time sensitive operation 200 and then it waits for that activity to be completed. If in the interim there was an EMI interruption this is detected at 204 and the time sensitive operation is repeated after the power supply recovers. The microprocessor may wait a short period of time before repeating the operation, for example, if the previous operation involved an ultra sonic pulse the microprocessor may wait until return echos, have ceased. If there was no EMI interruption then the results, for example, the output of transducer signal channel 34, are processed 206 and the results 208 are delivered to the digital communications circuit 20a.

Figure 3:
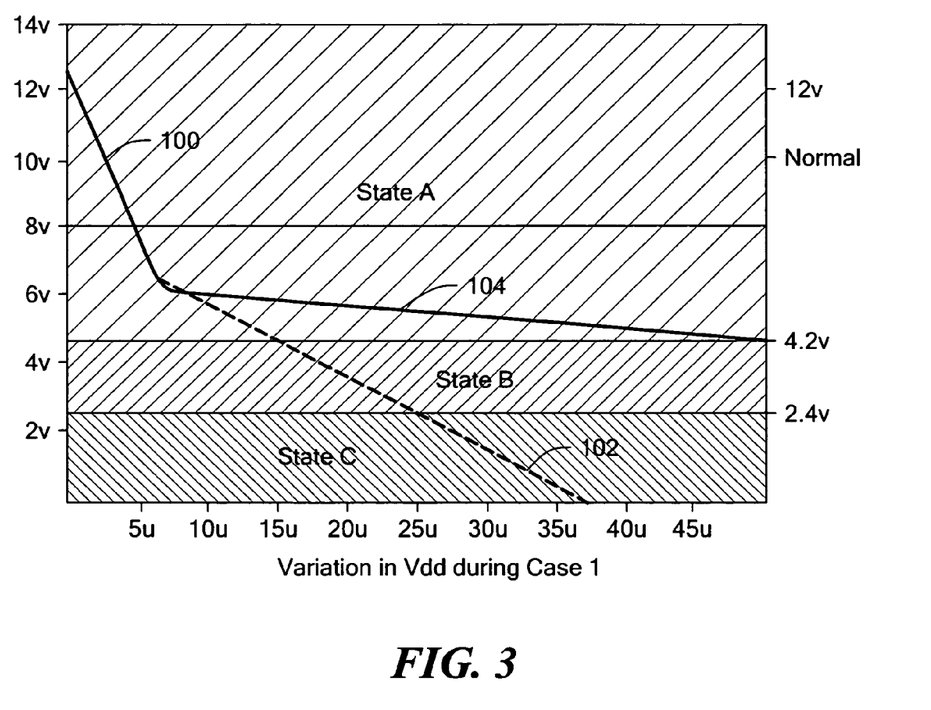
FIG. 3 is a graphical illustration of variation in power supply voltage over time when an interruption occurs at the same time as the acoustic pulse, the acoustic pulse is an example of a time sensitive operation which consumes a large amount of power.
Figure 4:
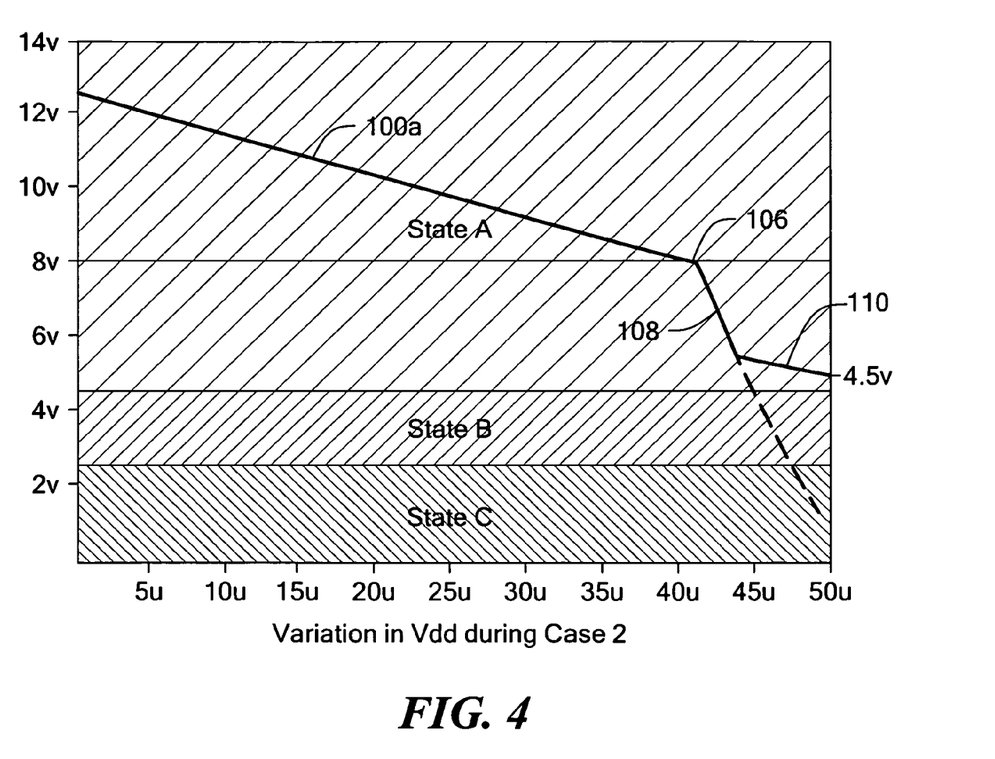
FIG. 4 is a graphical illustration of variation in power supply voltage over time when an acoustic pulse occurs during an interruption.

The efficacy of this invention can be better understood with reference to the examples shown in FIGS. 3 and 4 which show the variation of the voltage on the capacitor (90 Vdd) not to be confused with the external supply (82, Vbat) which is being interrupted. Time of the power supply interruption is specified as a maximum of 50 microseconds. There are three states shown. State A which is the normal state and covers the voltage range from approximately 12 volts down to 4.2. State B is the range from 4.2 volts to 2.4 volts: here below the approximately 4.2 volt minimum the system will continue to function but with degraded performance and with no loss of memory so that whatever processing was being performed when the clock signal was halted will be resumed. State C is the range from 2.4 volts to 0 volts, here there is no operation and memory is lost so that the system would have to be reset.

In FIG. 3 an acoustic pulse occurs simultaneously with an interruption in the power supply. There the voltage 100 drops sharply within 7 or 8 microseconds from 12 volts down to roughly six volts. If nothing is done, then, as shown at line 102, the system enters state B, at about 15 microseconds and has completely discharged the decoupling capacitor 90 in little more than 35 microseconds. However, with this invention shutting down the predetermined power consuming circuits 16, e.g. transducer signal channel 34, the discharge path shallows out as shown at 104 and at 50 microseconds has barely reached 4.2 volts. That is, it is on the border between normal state, state A and state B. In FIG. 4 the acoustic pulse occurs during power supply interruption and there is a similar improvement in operation. Here capacitor 90 (voltage Vdd 62) is discharging, 100a, then the supply monitor 24a operates, 106, at the 8 volt level and the voltage begins to drop abruptly 108. Within two microseconds EMI response control 26a operates at least clock gate one, 30, and the shallower slope of discharge 110 is returned to so that at 50 microseconds the voltage is only dropped to approximately 4.5 volts.

Figure 5:
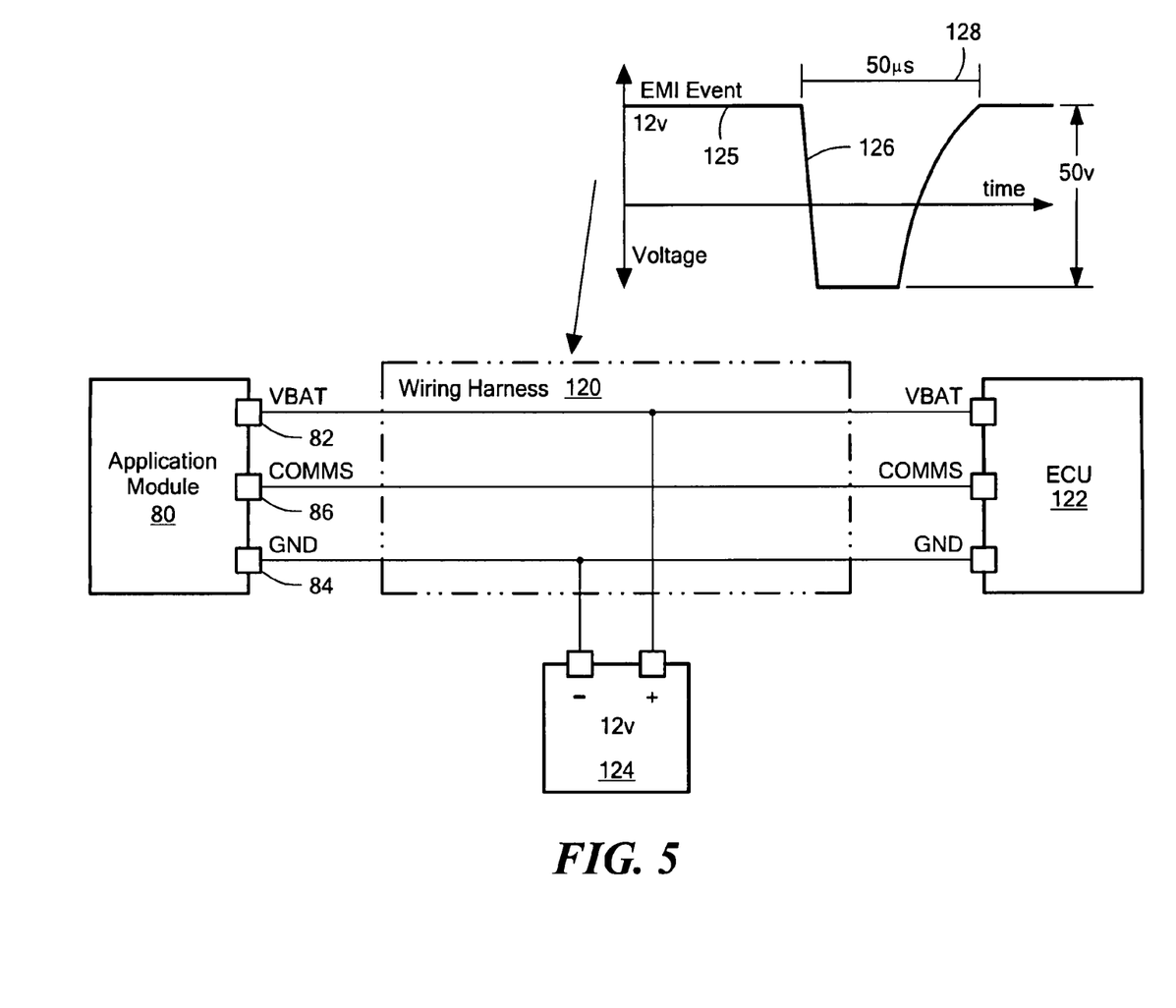
FIG. 5 is a schematic diagram showing interconnection of the module of FIG. 2 with the engine control unit primary computer over the vehicle wiring harness.

Application module 80, FIG. 5, has its pins 82, 86 and 84 connected through a wiring harness 120 to an engine control unit 122 conventionally contained in a vehicle. Also contained in a vehicle is a 12 volt battery 124 as the power supply. The engine control unit, as is well known, monitors and controls activities in the car engine and communicates with the application module 80 over the communications line on pin 86. When an electromagnetic interference event occurs, the engine control unit 122 must not be able to detect any problems with the application module 80. From the engine control unit 122 point of view there are three operating modes of the applications module as explained previously. In state A all functions are correct and within expected limits; in state B there is degradation of functions but no loss of stored memory data; in state C there is no damage to the applications module but complete or partial loss of stored memory occurs and the applications module can return to normal operation after the electromagnetic interference event. An electromagnetic interference event may occur through the wiring harness, e.g. from the car starter motor, alternator malfunction, or the automobile passing through radar installation near an airport, cellular phones. The electromagnetic event as explained in this particular embodiment is shown in the graphical illustration in FIG. 5, where the power supply is at 12 volts, 125, but can drop as much as 50 volts as at 126 for as long as 50 microseconds as shown at 128 before recovery occurs. The voltage levels and the times may vary in which case the parameters of the embodiment would change accordingly.

Figure 6:
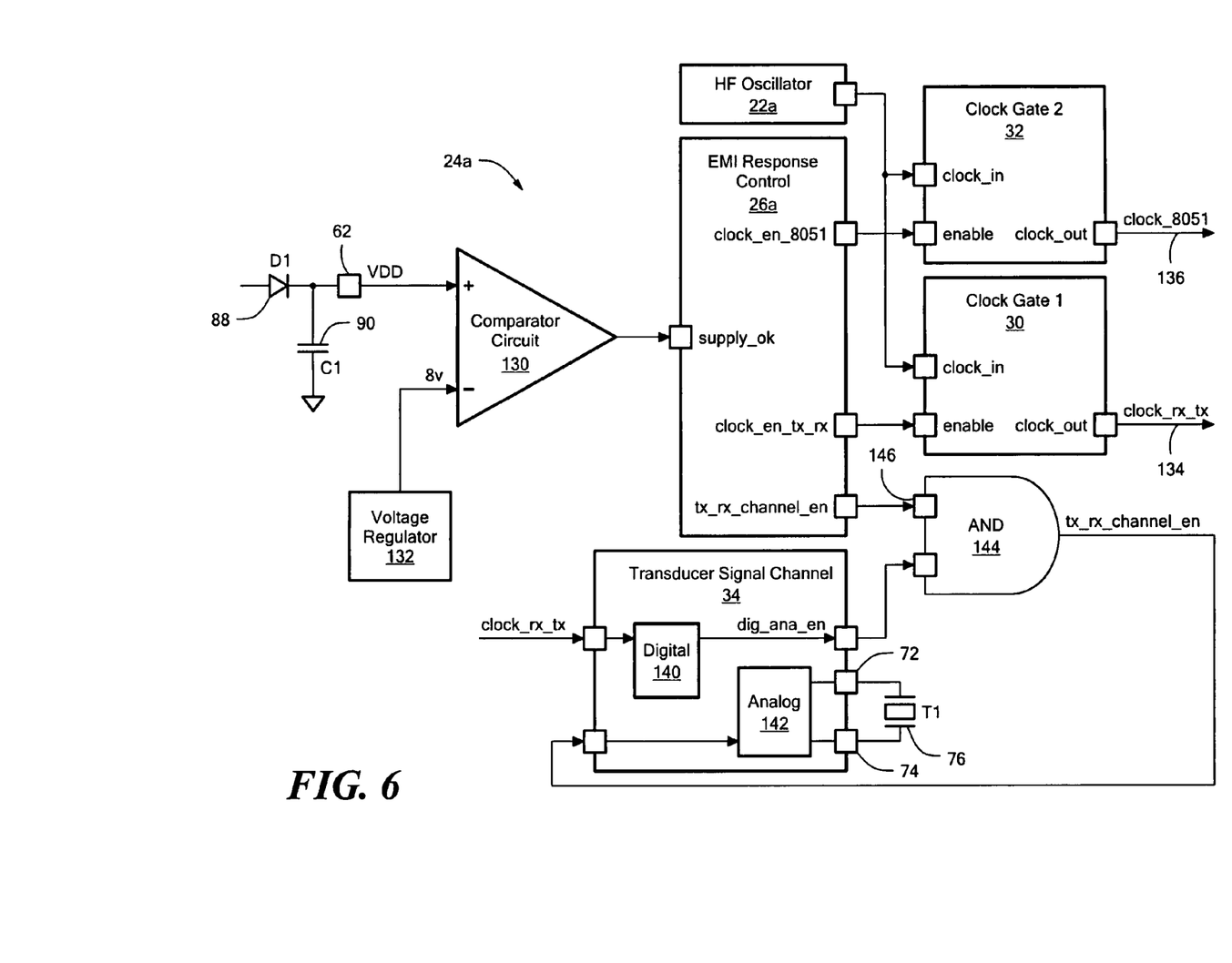
FIG. 6 is an enlarged detailed view of portions of the system of FIG. 2.

Supply monitor 24a may include a comparator circuit 130, FIG. 6, and a voltage reference source 132. In this case the reference voltage is 8 volts as indicated previously, so when comparator circuit 130 senses that the supply voltage Vdd has dropped below 8 volts, it provides a signal to EMI response control 26a which then disables clock gate one, 30 which halts the signal on line 134 to transducer signal channel 34 and also halts the clock signal on line 136 from clock gate two, 32, to microprocessor 42. Transducer signal channel 34 in FIG. 6 is shown as having a digital section 140 and an analog section 142. In the usual manner the digital section 140 requests that the analog signal activate and send a pulse to the transducer 76 and also process the return pulse. However, in accordance with this invention digital section 140 does not directly operate the analog section 142, rather analog section 142 is operated by the output from logic gate 144. Logic gate 144 provides an output as long as it receives an enabling input at pin 146 from EMI response control 26a indicating that the power supply is still operating properly, that is, above 8 volts and that the digital section 140 has called for analog operation. Only then will the analog section communicate a pulse to transducer 76 and respond to the return pulse. Only when transducer signal channel 34 receives the return pulse and has processed it will it be transferred to microprocessor controller 14a. If before the processing in transducer signal channel 34 is complete, the clock signal to it has been halted, there will be pulse information returned to the microprocessor controller, however it will be invalid and unusable due the interruption in processing caused by the power interruption and when the power supply returns to normal operation range the microprocessor controller will begin again by repeating that operation.

Figure 7:
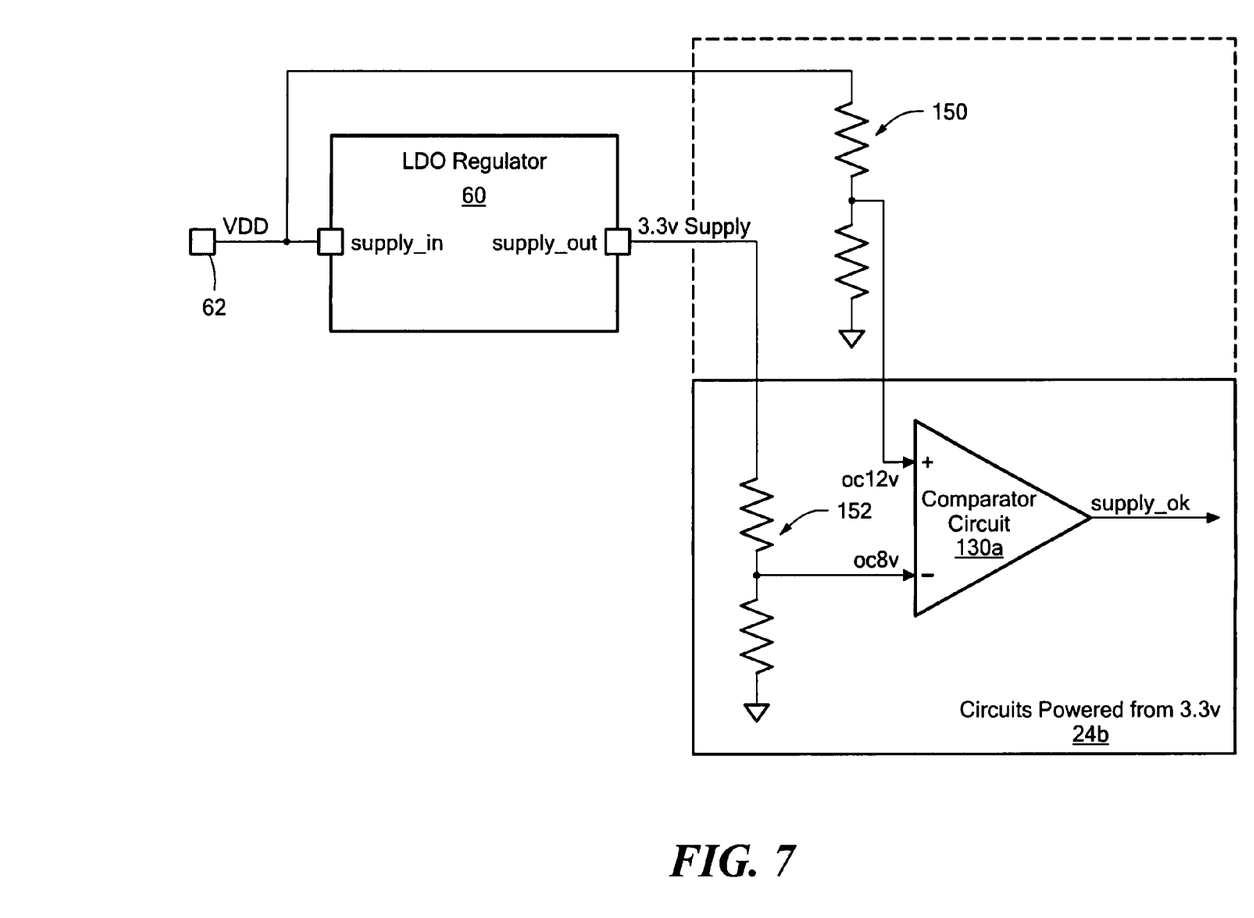
FIG. 7 is an enlarged detailed view of an alternative embodiment of the supply monitor of FIG. 2.

In order to accommodate the supply monitor 24b, FIG. 7, so that it can monitor a 12 volt power supply while being operated from only a 3.3 volt power supply. A pair of voltage dividers 150 and 152 are included to step down the power supply level and the 3.3 volt supply level reference at the input of comparator circuit 130a to levels which are proportional to 12 volts and proportional to 8 volts, respectively.

Figure 8:
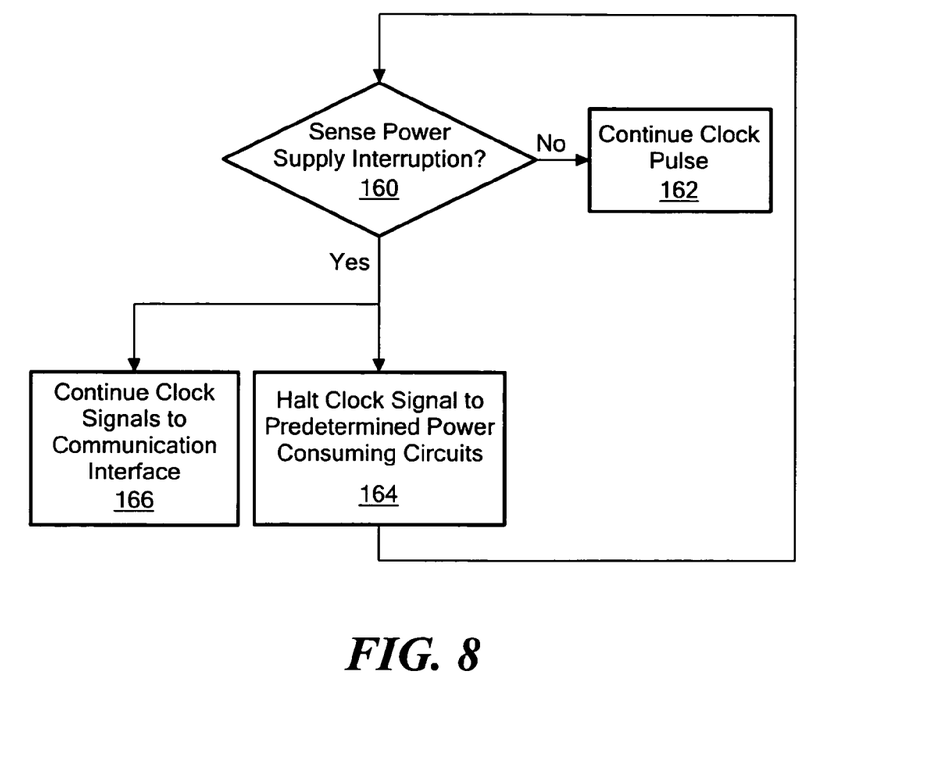
FIG. 8 is a flow chart showing the method of this invention.

The method of this invention is shown in FIG. 8 and begins simply with the inquiry as to whether a power supply interruption has been sensed 160, if it has not the clock pulses to all circuits are continued 162. If the response is affirmative, then the clock signals to predetermined power consuming circuits are halted, 164, but the clock signals to the communications interface 166 are continued and the system loops back to inquire once again is there a power supply interruption.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

The invention claimed is:

1. An automatic power saving system for decreasing power demand during a power interruption while maintaining an appearance of full operation of a signal processor to an external device, the signal processor including predetermined power consuming circuits, a communications interface, and a state machine, comprising:
 a supply monitor for sensing when a power supply interruption during operation has occurred;
 a clock generator for providing a clock signal;
 a clock gate circuit interconnected between said clock generator and said predetermined power consuming circuits; and a response control circuit responsive to said supply signal for operating said clock gate circuit to halt the clock signal to said predetermined power consuming circuits during a sensed power interruption, the clock signal being provided to said power consuming circuits and said communication interface during full operation;

said clock generator providing a clock signal to said communications interface regardless of the sensed power interruption for maintaining the appearance of full operations of the signal processor to the external device during the sensed power interruption.

2. The automatic power saving system of claim 1 in which said state machine includes a microprocessor controller.

3. The automatic power saving system of claim 2 in which said clock gate circuit provides a clock signal to said microprocessor controller which is halted upon a power interruption.

4. The automatic power saving system of claim 2 in which said microprocessor controller includes a microprocessor.

5. The automatic power saving system of claim 4 in which said microprocessor controller includes a ROM.

6. The automatic power saving system of claim 4 in which said microprocessor controller includes a SRAM.

7. The automatic power saving system of claim 4 in which said microprocessor controller includes a one time programmable memory (OTPM).

8. The automatic power saving system of claim 1 in which said predetermined power consuming circuit includes a transducer signal channel responsive to said digital state machine to generate acoustic transducer transmission pulses and to deliver return pulses to said state machine.

9. The automatic power saving system of claim 1 in which said signal processor includes other power consuming circuits.

10. The automatic power saving system of claim 9 in which said other power consuming circuit includes a temperature sensor.

11. The automatic power saving system of claim 9 in which said other power consuming circuits include a low frequency oscillator and a watchdog circuit.

12. The automatic power saving system of claim 8 in which said transducer signal channel includes a digital section, an analog section and a logic gate responsive to a signal from said digital section and said response control for enabling said analog section during the receipt of a return pulse in the absence of a sensed interruption.

13. The automatic power saving system of claim 1 in which said supply monitor includes a comparator circuit with one input responsive to power supply voltage and the other input to a reference voltage level.

14. The automatic power saving system of claim 13 in which said signal processor further includes a voltage regulator responsive to the power supply voltage to provide a regulated predefined voltage output.

15. The automatic power saving system of claim 14 in which said comparator circuit receives said regulated predefined voltage as said reference level.

16. The automatic power saving system of claim 15 in which said supply monitor includes a first voltage divider interconnected between said one input of said comparator circuit and said power supply voltage and a second voltage divider interconnected between said other input of said comparator circuit and said regulated predefined voltage output for scaling down the power supply voltage an regulated predefined voltage to the range of the comparator circuit.

17. The automatic power saving system of claim 4 in which said microprocessor controller includes a non-volatile multi-time programmable memory.

18. An automatic power saving system for decreasing power demand during a power interruption while maintaining an appearance of full operation of a signal processor to an external device, the signal processor including predetermined power consuming circuits, a communications interface, and a state machine, comprising:

a supply monitor for sensing when a power supply interruption during operation has occurred;

a clock generator for providing a clock signal;

a clock gate circuit interconnected between said clock generator and said predetermined power consuming circuits between said clock generator and said state machine; and a response control circuit responsive to said supply signal for operating said clock gate circuit to halt the clock signal to said predetermined power consuming circuits and said state machine during a sensed power interruption, the clock signal being provided to said power consuming circuits, said state machine, and said communication interface during full operation;

said clock generator providing a clock signal to said communications interface regardless of the sensed power interruption for maintaining the appearance of full operations of the signal processor to the external device during the sensed power interruption.

19. An automatic power saving method for decreasing power demand during a power interruption while maintaining an appearance of full operation of a signal processor to an external device, the signal processor including predefined power consuming circuits, a communication interface, and a state machine, comprising:

sensing when a power supply interruption during operation has occurred;

providing a clock signal;

halting the clock signal to said predefined power consuming circuits during a sensed power interruption, wherein the clock signal is provided to said predefined power consuming circuits and said communication interface during full operation; and continuing to provide a clock signal to the communication interface regardless of the sensed power interruption for maintaining the appearance of full operations of the signal processor to the external device during the sensed power interruption.

20. The automatic power supply method of claim 19 further including halting the clock signal to said state machine during said sensed interruption.

21. An automatic power saving system for decreasing power demand during a power interruption while maintaining an appearance of full operation of a signal processor to an external device, comprising:

a monitor, coupled to a power supply signal, for sensing when a power supply interruption during operation has occurred;

a clock gate circuit coupled to a clock generator and a power consuming circuit, a clock signal from the clock generator is provided to said power consuming circuit and a communication interface during full operation; and a control circuit, responsive to said power supply interruption, for operating said clock gate circuit to halt the clock signal to said power consuming circuit during a power interruption while providing the clock signal to said communication interface to maintain the appearance of full operation to an external device.

22. The automatic power saving system of claim 21, further comprising a clock to generate the clock signal.

23. The automatic power saving system of claim 21, wherein said power consuming circuit is a temperature sensor.

24. The automatic power saving system of claim 21, wherein said power consuming circuit is a low frequency oscillator and a watchdog circuit.

25. The automatic power saving system of claim 1, wherein the predetermined power consuming circuits provide information gathering operations.

26. The automatic power saving system of claim 18, wherein the predetermined power consuming circuits provide information gathering operations.

27. The automatic power supply method of claim 19, wherein the predefined power consuming circuits provide information gathering operations.

28. The automatic power saving system of claim 21, wherein the power consuming circuit provides an information gathering operation.

\* \* \* \* \*

UNITED STATES PATENT AND TRADEMARK OFFICE
CERTIFICATE OF CORRECTION

| | | |
|---|---|---|
| PATENT NO. | : 8,595,532 B1 | Page 1 of 1 |
| APPLICATION NO. | : 12/217319 | |
| DATED | : November 26, 2013 | |
| INVENTOR(S) | : Wright et al. | |

It is certified that error appears in the above-identified patent and that said Letters Patent is hereby corrected as shown below:

On the Title page, in the Title (Item 54), and in the Specification, column 1, please change:

"POWER INTERUPTIONS" to --POWER INTERRUPTIONS--

In the Claims

In column 9, lines 66-67, claim 16, change

"power supply voltage an regulated predefined voltage"
to
--power supply voltage and regulated predefined voltage--

Signed and Sealed this
Twenty-ninth Day of September, 2015

Michelle K. Lee
*Director of the United States Patent and Trademark Office*